June 24, 1958  J. J. MORSCH  2,839,946
ACCELERATOR PEDAL LATCHES
Filed Dec. 22, 1955
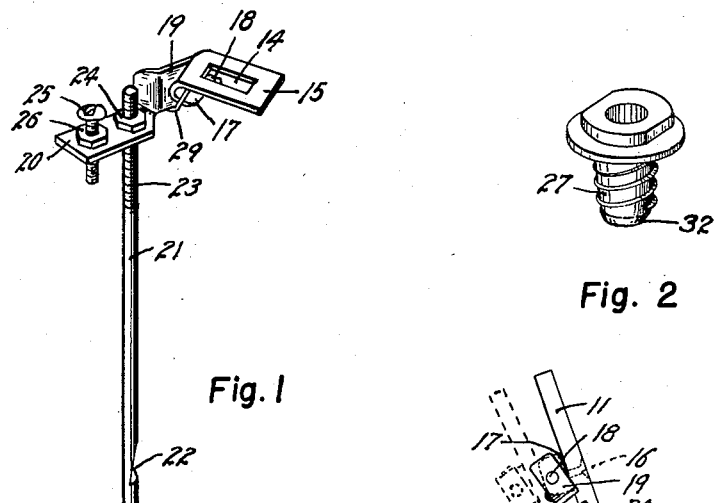
Fig. 1
Fig. 2
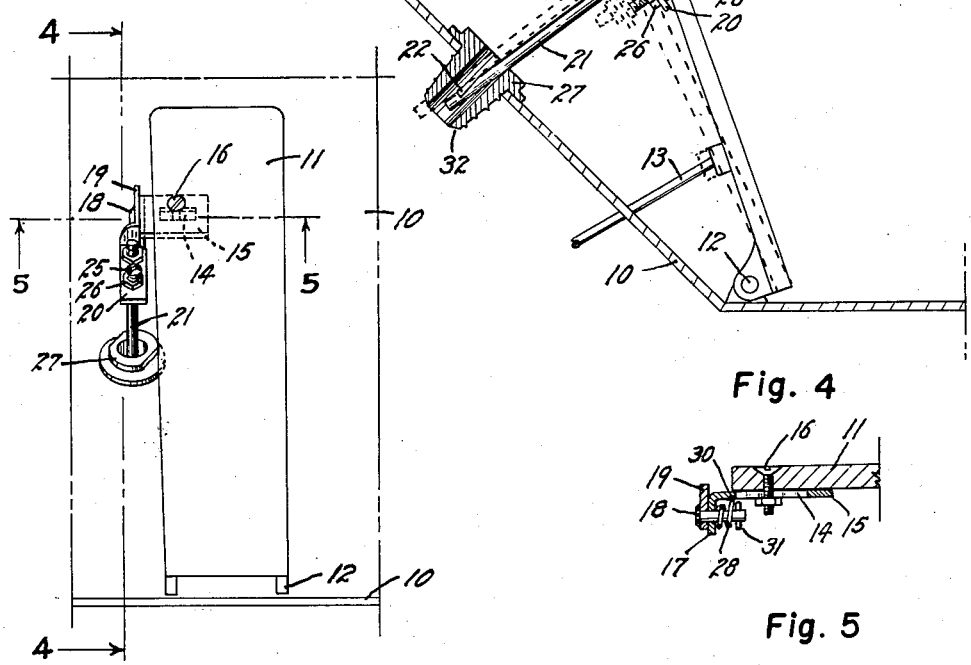
Fig. 3
Fig. 4
Fig. 5
INVENTOR.
Jesse J. Morsch
BY
ATTORNEY United States Patent Office
2,839,946
Patented June 24, 1958

2,839,946

ACCELERATOR PEDAL LATCHES

Jesse J. Morsch, Douglas, Wyo.

Application December 22, 1955, Serial No. 554,749

2 Claims. (Cl. 74—513)

This invention relates to a pedal latching device for maintaining the accelerator pedal of an automotive vehicle depressed so that the engine will idle at a predetermined speed.

It is often desirable in cold weather to allow the engine of an automotive vehicle to idle before the car is to be used, to warm the engine and the oil so as to prevent damage to the bearing. It is also desirable at times to idle an automotive engine at faster than the conventional idler speed to prevent discharge of the battery and to provide a charge for the battery.

The principal object of this invention is to provide an attachment for the accelerator pedal of an automotive vehicle which can be used to maintain the pedal slightly depressed so that the engine will idle at a higher speed than the normal idling speed for warming, battery charging and engine tuning purposes.

Another object of the invention is to so construct the device that it can be quickly and easily applied to any conventional accelerator pedal, and so that it will act to immediately and automatically release the pedal when the latter is depressed for normal driving purposes.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a perspective view illustrating that portion of the improved accelerator pedal latch which is adapted to be secured to a conventional accelerator pedal;

Fig. 2 is a similar perspective view illustrating that portion of the device which is adapted to be inserted through the floor board of a conventional automotive vehicle;

Fig. 3 is a rear elevational view of a conventional automotive accelerator pedal illustrating the improved latching device applied thereto;

Fig. 4 is a fragmentary cross section, taken on the line 4—4, Fig. 3; and

Fig. 5 is an enlarged detail section, taken on the line 5—5, Fig. 3.

In the drawing the floor board of a conventional automotive vehicle has been indicated in cross-section at 10 in Fig. 4, with a conventional accelerator pedal 11 hingedly mounted thereon by means of a suitable hinge 12. The accelerator pedal is of any conventional type designed to actuate a throttle rod 13 for controlling the gas admission to an automotive engine.

The pedal portion of the improved latching device comprises an angle clip 15 adapted to be secured against the bottom of the pedal 11, so as to project outwardly beyond the left side thereof, by means of a suitable attachment bolt 16. The clip 15 is provided with an elongated bolt opening 14 to allow the clip to be adjusted so as to obtain the desired sideward projection from the pedal.

The outer extremity of the clip 15 is turned at an angle of 90° to provide a mounting ear 17 through which a pivot pin 18 extends to pivotally secure a lever member 19 thereon. The lever member 19 is formed with a flat pad portion 20 through which a hook rod 21 extends. The lower extremity of the hook rod is notched, as shown at 22, to provide a hook extremity thereon. The upper extremity of the hook rod is threaded, as shown at 23, and provided with lock nuts 24 for locking it in any desired longitudinal position in the pad portion 20.

An actuating screw 25 extends downwardly through the pad portion 20 and is provided with lock nuts 26 by means of which it may be locked in any desired vertical position in the pad 20.

The hook rod 21 is designed to enter a threaded bushing 27 which is threaded through the floor 10 of the vehicle. The bushing is preferably of the tapered, self-threading type so that it may be screwed through a hole in the floor to rigidly maintain its position therein.

A torsion spring 28 surrounds the pivot pin 18. One extremity of the torsion spring engages the lever member 19, as indicated at 29 and the other extremity engages the bottom of the angle clip 15, as indicated at 30. The reaction of the spring 28 is such as to constantly urge the hook rod downwardly within the bushing 27, as shown in solid line in Fig. 4.

Let us assume that the driver desires to latch the accelerator pedal 11 in a depressed position. He places his right foot upon the pedal 11, with the left side of his shoe sole overlapping the actuating screw 25. He now forces the pedal downwardly to force the hook rod 21 through the bushing 27 and tilts his foot slightly to the left so as to hold the actuating screw 25 in the depressed position and allows the pedal to rise. This causes the notch 22 to engage the upper portion of the lower extremity of the bushing 27 to hold the pedal in the depressed position, as indicated in broken line in Fig. 4. This causes the automotive engine to operate at a higher than normal idling speed.

To release the latch device, it is only necessary for the operator to slightly depress the pedal 11. This releases the frictional engagement between the notch 22 and the bushing 27 so that the spring 28 will act to snap the hooked rod 21 to the non-engaging or solid line position of Fig. 4 to allow normal use of the accelerator pedal.

The device can be adjusted for different types of automotive vehicles and for different degrees of pedal depression by varying the position of the hooked rod 21 in the pad portion 20. When the desired position has been reached, the rod is locked in place by means of the lock nuts 24. The device can also be adjusted for differing thicknesses of pedals and pedal pads and to suit various operators' desires by varying the vertical projection of the actuating screw 25 from the pad portion 20 and locking it in the desired position by means of the lock nuts 26.

The head of the screw 25 should be positioned slightly below the plane of the top surface of the pedal 11 so that it will not be contacted by the shoe sole during normal operation of the vehicle. It is preferred to form the lower extremity of the bushing 27 with a conical taper as indicated at 32 to provide a relatively sharp edge for engaging and holding the notch 22.

The pivot pin 18 is resiliently maintained in place by means of a suitable cotter key 31 which is passed through a diametric opening in the pin and bears against the spring 28. If the lever member 19 is forced outwardly the cotter key will act against and compress the spring 28 axially.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A device for maintaining an accelerator pedal in the depressed position relative to a floor board of an automotive vehicle comprising: an angle clip; means securing said clip to the bottom of the accelerator pedal so that said clip will project to one side of the pedal with the outer extremity of said clip lying in a vertical plane; a lever member pivotally mounted on said outer extremity and extending rearwardly alongside said pedal and having a flat pad portion; an elongated straight rod extending through said pad portion and forwardly and downwardly therefrom; lock nuts threaded upon the upper extremity of said rod and securing the latter in said pad portion; an axially elongated, externally threaded tubular bushing mounted on the floor board, the lower extremity of said rod extending into said bushing; a notch formed in said lower extremity and adapted to engage said bushing to maintain said pedal depressed; spring means constantly biasing said rod in a direction to prevent engagement of said notch with said bushing so as to allow normal free up and down movement of said pedal; and means for manually actuating said rod against the bias of said spring so that said notch will engage said bushing to maintain said pedal depressed when desired.

2. A device for maintaining an accelerator pedal in the depressed position as described in claim 1 in which the means for manually actuating said rod comprises: a screw mounted in the pad portion of said lever below said rod and extending upwardly to be contacted by the foot of an operator to swing said notch into engagement with said bushing.

References Cited in the file of this patent

UNITED STATES PATENTS

| | | |
|---|---|---|
| 1,277,184 | Brewen | Aug. 27, 1918 |
| 1,387,775 | Headley | Aug. 16, 1921 |
| 1,563,778 | Mudd | Dec. 1, 1925 |
| 2,481,167 | Siever | Sept. 6, 1949 |
| 2,532,861 | Siever | Dec. 5, 1950 |